United States Patent
Hasiuk et al.

(10) Patent No.: US 7,945,914 B2
(45) Date of Patent: May 17, 2011

(54) METHODS AND SYSTEMS FOR PERFORMING OPERATIONS IN RESPONSE TO DETECTING A COMPUTER IDLE CONDITION

(75) Inventors: Lee Z. Hasiuk, Rochester, NY (US); Steven Lee Colwell, Santa Barbara, CA (US)

(73) Assignee: X1 Technologies, Inc., Pasadena, CA (US)

( * ) Notice: Subject to any disclaimer, the term of this patent is extended or adjusted under 35 U.S.C. 154(b) by 1564 days.

(21) Appl. No.: 11/006,508

(22) Filed: Dec. 7, 2004

(65) Prior Publication Data

US 2005/0149932 A1 Jul. 7, 2005

Related U.S. Application Data

(60) Provisional application No. 60/528,787, filed on Dec. 10, 2003.

(51) Int. Cl.
    *G06F 9/46* (2006.01)
(52) U.S. Cl. .......................... 718/107; 718/108
(58) Field of Classification Search .......... 718/102, 718/100
    See application file for complete search history.

(56) References Cited

U.S. PATENT DOCUMENTS

| | | | | |
|---|---|---|---|---|
| 4,466,065 A | * | 8/1984 | Advani et al. | 710/54 |
| 5,111,398 A | | 5/1992 | Nunberg et al. | |
| 5,502,840 A | * | 3/1996 | Barton | 710/200 |
| 5,692,173 A | | 11/1997 | Chew | |
| 5,721,897 A | | 2/1998 | Rubinstein | |
| 5,784,616 A | * | 7/1998 | Horvitz | 718/102 |
| 5,812,844 A | * | 9/1998 | Jones et al. | 718/104 |
| 5,828,879 A | * | 10/1998 | Bennett | 718/102 |
| 5,832,208 A | | 11/1998 | Chen et al. | |
| 5,842,208 A | * | 11/1998 | Blank et al. | 707/7 |
| 5,854,897 A | * | 12/1998 | Radziewicz et al. | 709/224 |
| 5,902,352 A | * | 5/1999 | Chou et al. | 718/102 |
| 5,907,837 A | | 5/1999 | Ferrel et al. | |
| 5,920,854 A | | 7/1999 | Kirsch et al. | |
| 5,938,723 A | * | 8/1999 | Hales et al. | 709/204 |
| 5,941,944 A | * | 8/1999 | Messerly | 709/203 |
| 5,953,536 A | * | 9/1999 | Nowlin, Jr. | 713/323 |

(Continued)

OTHER PUBLICATIONS

Lotus Magellan Explorer's Guide © 1989 Lotus Development Corporation.

(Continued)

*Primary Examiner* — Emerson C Puente
*Assistant Examiner* — Adam Lee
(74) *Attorney, Agent, or Firm* — Knobbe Martens Olson & Bear LLP (57) ABSTRACT

Embodiments of the invention enable the efficient use of shared resources by different processes, such as background and foreground processes sharing a mass storage device. Thus, disk intensive operations, such as file indexing, do not unduly interfere with higher priority processes. In one embodiment, a first process is permitted to access a computer resource for a first predetermined time period. After the first predetermined time period has elapsed, the first process is inhibited from accessing the computer resource for a second predetermined time period. After the second predetermined time period has elapsed, a determination is made as to whether the computer resource is idle, wherein if the computer resource is not idle, the embodiment waits for a third predetermined time period and again determining if the computer resource is idle, and wherein if the computer resource is idle, the embodiment allows the first process to access the computer resource again.

86 Claims, 3 Drawing Sheets

U.S. PATENT DOCUMENTS

| | | | | |
|---|---|---|---|---|
| 5,995,997 | A * | 11/1999 | Horvitz | 718/102 |
| 6,002,409 | A * | 12/1999 | Harkin | 345/506 |
| 6,005,575 | A * | 12/1999 | Colleran et al. | 715/807 |
| 6,009,452 | A * | 12/1999 | Horvitz | 718/102 |
| 6,014,681 | A * | 1/2000 | Walker et al. | 715/234 |
| 6,035,325 | A | 3/2000 | Potts | |
| 6,070,158 | A | 5/2000 | Kirsch et al. | |
| 6,073,133 | A | 6/2000 | Chrabaszcz | |
| 6,085,193 | A | 7/2000 | Malkin et al. | |
| 6,092,163 | A * | 7/2000 | Kyler et al. | 711/163 |
| 6,097,390 | A * | 8/2000 | Marks | 715/772 |
| 6,112,172 | A | 8/2000 | True et al. | |
| 6,112,243 | A * | 8/2000 | Downs et al. | 709/226 |
| 6,118,428 | A * | 9/2000 | Blackmon et al. | 715/209 |
| 6,223,201 | B1 * | 4/2001 | Reznak | 718/102 |
| 6,223,204 | B1 * | 4/2001 | Tucker | 718/103 |
| 6,243,736 | B1 * | 6/2001 | Diepstraten et al. | 718/108 |
| 6,260,150 | B1 * | 7/2001 | Diepstraten et al. | 713/323 |
| 6,330,567 | B1 | 12/2001 | Chao | |
| 6,341,303 | B1 * | 1/2002 | Rhee et al. | 718/104 |
| 6,349,370 | B1 * | 2/2002 | Imamura | 711/147 |
| 6,353,857 | B2 * | 3/2002 | Bader et al. | 709/246 |
| 6,385,638 | B1 * | 5/2002 | Baker-Harvey | 718/107 |
| 6,385,708 | B1 * | 5/2002 | Stracovsky et al. | 711/167 |
| 6,415,372 | B1 * | 7/2002 | Zakai et al. | 711/165 |
| 6,434,589 | B1 * | 8/2002 | Lin et al. | 718/100 |
| 6,490,612 | B1 * | 12/2002 | Jones et al. | 718/107 |
| 6,499,086 | B2 * | 12/2002 | Belt et al. | 711/118 |
| 6,563,913 | B1 * | 5/2003 | Kaghazian | 379/93.24 |
| 6,601,153 | B1 * | 7/2003 | Engelbrecht et al. | 711/166 |
| 6,615,237 | B1 | 9/2003 | Kyne et al. | |
| 6,640,244 | B1 * | 10/2003 | Bowman-Amuah | 709/207 |
| 6,651,081 | B1 * | 11/2003 | Salgado et al. | 718/103 |
| 6,665,668 | B1 | 12/2003 | Sugaya et al. | |
| 6,675,192 | B2 * | 1/2004 | Emer et al. | 718/107 |
| 6,711,565 | B1 | 3/2004 | Subramaniam et al. | |
| 6,757,897 | B1 * | 6/2004 | Shi et al. | 718/102 |
| 6,785,889 | B1 * | 8/2004 | Williams | 718/104 |
| 6,834,386 | B1 * | 12/2004 | Douceur et al. | 718/107 |
| 6,847,959 | B1 | 1/2005 | Arrouye et al. | |
| 6,862,713 | B1 | 3/2005 | Kraft et al. | |
| 6,873,982 | B1 | 3/2005 | Bates et al. | |
| 6,920,632 | B2 * | 7/2005 | Donovan et al. | 718/103 |
| 6,986,141 | B1 * | 1/2006 | Diepstraten et al. | 718/108 |
| 2001/0042090 | A1 * | 11/2001 | Williams | 709/102 |
| 2002/0052909 | A1 * | 5/2002 | Seeds | 709/104 |
| 2002/0055981 | A1 | 5/2002 | Spaey et al. | |
| 2002/0078121 | A1 * | 6/2002 | Ballantyne | 709/102 |
| 2002/0129083 | A1 * | 9/2002 | Abe et al. | 709/102 |
| 2002/0152292 | A1 * | 10/2002 | Motoyama et al. | 709/223 |
| 2002/0165707 | A1 | 11/2002 | Call | |
| 2002/0178009 | A1 | 11/2002 | Firman | |
| 2002/0184290 | A1 * | 12/2002 | Olszewski et al. | 709/102 |
| 2002/0184317 | A1 | 12/2002 | Thankachan | |
| 2003/0037094 | A1 * | 2/2003 | Douceur et al. | 709/201 |
| 2003/0061258 | A1 * | 3/2003 | Rodgers et al. | 709/102 |
| 2003/0061260 | A1 * | 3/2003 | Rajkumar | 709/104 |
| 2003/0084087 | A1 * | 5/2003 | Berry | 709/102 |
| 2003/0084096 | A1 | 5/2003 | Starbuck et al. | |
| 2003/0130993 | A1 | 7/2003 | Mendelevitch et al. | |
| 2003/0154233 | A1 * | 8/2003 | Patterson | 709/104 |
| 2003/0154235 | A1 * | 8/2003 | Sager | 709/108 |
| 2003/0220984 | A1 * | 11/2003 | Jones et al. | 709/219 |
| 2003/0221059 | A1 * | 11/2003 | Emmot et al. | 711/114 |
| 2003/0227489 | A1 | 12/2003 | Arend et al. | |
| 2003/0229898 | A1 | 12/2003 | Babu et al. | |
| 2003/0233419 | A1 | 12/2003 | Beringer | |
| 2005/0256846 | A1 | 11/2005 | Zigmond et al. | |

OTHER PUBLICATIONS

Chris Sherman, "Enfish Tracker Pro," © Jan. 1999; printed from http://www.onlinemag.net/OL1999/sherman1.html.

Jon Halpin, "PC Data Finder Goes A-Hunting," Jun. 19, 2001; printed from http://www.pcmag.com/article2/0,4149,144228,00.asp.

Carol Ellison, "Info to Go," Jun. 30, 2002; printed from http://www.pcmag.com/article2/0,1759,3575.00.asp.

Lotus Magellan Product Information Guide, Circa 1989.

Lotus Magellan Explorer's Guide ©1989 Lotus Development Corporation.

Chris Sherman, "Enfish Tracker Pro," © Jan. 1999; printed from http://www.onlinemag.net/OL1999/sherman1.html.

Jon Halpin, "PC Data Finder Goes A-Hunting," Jun. 19, 2001; printed from http://www.pcmag.com/article2/0,4149,144228,00.asp.

Carol Ellison, "Info to Go," Jun. 30, 2002; printed from http://www.pcmag.com/article2/0,1759,3575.00.asp.

Steve Barth, 'Personal Toolkit: Navigating Information and Ideas, KMWorld Apr. 2003, vol. 12, Issue 4; printed from http://www.kmworid.com/publications/magazine/Index.cfm?action=readarticle&article id-1505&publication id=1.

International Search Report from corresponding PCT Application PCT/US03/27241.

Chapter 14, Section 14.5 "JavaScript & DHTML Cookbook" by Danny Goodman; ISBN:0-596-00467-2; Publisher: O'Reilly; Print Publication Date Apr. 1, 2003.

Stop words, Wikipedia, http://en.wikipedia.ord/wiki/Stop_words; Dec. 12, 2006.

Inverted index, Wikipedia, http://en.wikipedia.org/wiki/Inverted_index; Dec. 12, 2006.

Proximity search (text), Wikipedia, http://en.wikipedia.org/wiki/Proximity_search_%28text%29; Dec. 12, 2006

* cited by examiner

METHODS AND SYSTEMS FOR PERFORMING OPERATIONS IN RESPONSE TO DETECTING A COMPUTER IDLE CONDITION

PRIORITY CLAIM

This application claims the benefit under 35 U.S.C. 119(e) of U.S. Provisional Application No. 60/528,787, filed Dec. 10, 2003, the contents of which are incorporated herein in their entirety.

BACKGROUND OF THE INVENTION

1. Field of the Invention

The present invention is related to allocation of computer resources, and in particular to sharing computer resources based in part on detecting an idle condition.

2. Description of the Related Art

Many conventional general-purpose computers, such as personal computers, spend a significant portion of their time executing an idle loop because these conventional computers are typically capable of executing instructions at a much faster rate than required by the software that they run. Often, even a program which is running without waiting for user interaction will often end up giving CPU cycles to the idle loop because the program is waiting for disk I/O operations, such as data transfers to or from a hard disk drive, to complete. For example, if a single disk head seek takes 10 milliseconds, the computer processor clocked at 2 gigahertz can execute 20 million idle instruction cycles during the 10 milliseconds. Each such seek which occurs per second will cause the CPU to spend an additional 1% of its time in the idle loop.

In many conventional modem operating systems, multiple programs may be run at once. A distinction is often made between the program the user is interacting with or waiting for, called the foreground process, and one or more programs that are running tasks less important to the user at the moment, called background processes. Background processes may run at a lower scheduling priority than the foreground process, so that the background processes will not unduly slow down the primary computational task. Some such background processes may voluntarily set their own priorities to a very low level, sometimes referred to as "idle priority", in an attempt to have no or little impact on the apparent speed of the computer from the user's perspective. With such a low priority, many conventional operating systems will allow these processes to run only when the system would otherwise be running its idle loop.

Such a scheme may work adequately if a background process is only going to utilize processor computation resources. However, if the background process accesses the disk at the same time that the foreground process does, system performance may rapidly deteriorate. Because a single disk head seek can take approximately 10 milliseconds, only 100 such seeks may be performed every second. If the background process causes the disk heads to move away from the area of the disk that the foreground process was about to access next, the foreground process may spend 20 milliseconds waiting for the disk head to move to the location the background process is accessing and back again.

When the foreground process is performing tasks whose completion time is bound by disk I/O speed, such disk head seeks resulting from sharing disk access with the background process can cause the overall task completion time to take many times longer as compared to the scenario where the foreground process has exclusive use of the disk. This is because the disk may be performing many seeks where none may be needed if only one process were accessing the disk.

By way of example, one background process could be an indexing process. The indexing process may perform many disk I/O operations, such as when indexing the contents of the user's hard disk to allow the user to rapidly find files which contain certain words or phrases. Such a background process, even if set to run at "idle priority", may greatly slow down the apparent speed of a foreground process that performs disk I/O operations because, while running, the indexing process is constantly reading from and writing to the user's hard disk.

SUMMARY OF THE INVENTION

As discussed below, embodiments of the present invention enable the efficient use of shared resources by different processes, such as background and foreground processes sharing a mass storage device. Thus, disk intensive operations, such as file indexing, do not unduly interfere with higher priority processes.

One embodiment provides method of determining when to perform a computer background process, the method comprising: allowing the computer background process to access a computer resource for a first predetermined time period; after the first predetermined time period has elapsed, inhibiting the computer background process from accessing the computer resource for a second predetermined time period; after the second predetermined time period has elapsed, determining if the computer resource is being used by another process, wherein if the computer resource is being used by another process, waiting for a third predetermined time period and again determining if the computer resource is being used by another process, and if the computer resource is not being used by another process, allowing the computer background process to access the computer resource again.

Another embodiment provides a computer system that detects a computer resource idle condition, the computer system comprising: a processor; memory coupled to the processor; a computer resource; and program instructions stored in computer readable memory configured to: enable a computer background process to access the computer resource for a first time period; after the first predetermined time period has elapsed, prevent the computer background process from accessing the computer resource for a second time period; determine if the computer resource is idle; allow the computer background process to access the computer resource again if the computer resource is idle; prevent the computer background process from accessing the computer resource for a third time period, if the computer resource is not idle, and after the third time period, again determine if the computer resource is being used by another process.

Still another embodiment provides a method of allocating access to a computer resource, the method comprising: permitting a first process to access a computer resource for a first time period; after the first time period has elapsed, inhibiting the first process from accessing the computer resource for a second time period; after the second time period has elapsed, determining if the computer resource is idle based at least in part on a computer resource performance indicator, wherein if the computer resource is not idle, waiting for a third predetermined time period and again determining if the computer resource is idle, and if the computer resource is idle, allowing the first process to access the computer resource again.

Yet another embodiment provides a system that allocates access to a computer resource, the system comprising: computer readable memory; and instructions stored in the computer readable memory configured to: permit a first process to access a computer resource for a first time period; after the first time period has elapsed, inhibit the first process from accessing the computer resource for a second time period; after the second time period has elapsed, determine if the computer resource is idle based at least in part on a computer resource performance indicator, wherein if the computer resource is not idle, cause the first process to wait for a third predetermined time period and again determine if the computer resource is idle, and if the computer resource is idle, allow the first process to access the computer resource again.

DETAILED DESCRIPTION OF PREFERRED EMBODIMENTS

Embodiments of the present invention determine when a computer and/or resource therein is idle. The determination can take into account the processor or central processing unit (CPU) load, as measured by the time spent in the idle loop, as well as the load on other shared system resources, such as disk drives. Based on such determination, a background process is selectively provided access to the shared resource.

Unless otherwise indicated, the functions described herein are preferably performed by executable code and instructions running on one or more general-purpose computers, terminals, personal digital assistants, other processor-based systems, or the like. However, the present invention can also be implemented using special purpose computers, state machines, and/or hardwired electronic circuits. The example processes described herein do not necessarily have to be performed in the described sequence, and not all states have to be reached or performed.

Embodiments of the present invention can be used with numerous different operating systems, including by way of example and not limitation, Microsoft's Windows operating systems, Sun Solaris operating systems, Linux operating systems, Unix operating systems, Apple operating systems, as well as other operating systems.

By way of example, with respect to operating systems based on Microsoft Windows NT (including without limitation Windows 2000, Windows 2003 and Windows XP), the operating system provides a mechanism whereby the various subsystems, such as the CPU, network hardware, disk drives, other mass storage devices, etc., can include "performance counters" which are used to record statistics regarding their operation. For example, a network interface might provide information about the number of packets the network interface has received, the number of packets waiting to be sent, and other values that would allow a program to analyze or display the current load and performance of the network hardware.

For a disk drive, the disk-related statistics can include the percentage of time the disk is idle, the average number of bytes or other data amount per read, the number of writes per second, and many other similar values. These values are made available to running programs through a variety of mechanisms, including the system registry, the "Performance Data Helper" library, and/or Windows Management Instrumentation (WMI). Some of these values are averages or occurrences over time (for example, bytes per second), and some values, such as "current disk queue length," give a program access to what is happening at substantially the current moment.

By way of further example, Windows Server 2003 provides the performance counters described in Table 1.

TABLE 1

PhysicalDisk Object

The PhysicalDisk performance object includes counters that monitor hard or fixed disk drives. Disks are used to store file, program, and paging data. They are read to retrieve these items, and are written to record changes to them. The values of physical disk counters are sums of the values of the logical disks (or partitions) into which they are divided.

| Counter Name | Description |
| --- | --- |
| % Disk Read Time | Shows the percentage of time that the selected disk drive was busy servicing read requests. |
| % Disk Time | Shows the percentage of elapsed time that the selected disk drive was busy servicing read or write requests. |
| % Disk Write Time | Shows the percentage of elapsed time that the selected disk drive was busy servicing write requests. |
| % Idle Time | Shows the percentage of elapsed time during the sample interval that the selected disk drive was idle. |
| Avg. Disk Bytes/Read | Shows the average number of bytes that were transferred from the disk during read operations. |
| Avg. Disk Bytes/Transfer | Shows the average number of bytes that were transferred to or from the disk during write or read operations. |
| Avg. Disk Bytes/Write | Shows the average number of bytes that were transferred to the disk during write operations. |
| Avg. Disk Queue Length | Shows the average number of both read and write requests that were queued for the selected disk during the sample interval. |
| Avg. Disk Read Queue Length | Shows the average number of read requests that were queued for the selected disk during the sample interval. |
| Avg. Disk sec/Read | Shows the average time, in seconds, of a read of data from the disk. |

TABLE 1-continued

PhysicalDisk Object

The PhysicalDisk performance object includes counters that monitor hard or fixed disk drives. Disks are used to store file, program, and paging data. They are read to retrieve these items, and are written to record changes to them. The values of physical disk counters are sums of the values of the logical disks (or partitions) into which they are divided.

| Counter Name | Description |
| --- | --- |
| Avg. Disk sec/Transfer | Shows the average time, in seconds, of a disk transfer. |
| Avg. Disk sec/Write | Shows the average time, in seconds, of a write of data to the disk. |
| Avg. Disk Write Queue Length | Shows the average number of write requests that were queued for the selected disk during the sample interval. |
| Current Disk Queue Length | Shows the number of requests that were outstanding on the disk at the time that the performance data was collected. This is a snapshot, not an average over the time interval. It includes requests in service at the time of the collection. Multispindle disk devices can have multiple requests active at one time, but other concurrent requests are awaiting service. This counter might reflect a transitory high or low queue length, but if this counter is consistently high, then it is likely that there is a sustained load on the disk drive. Requests experience delays proportional to the length of this queue, minus the number of spindles on the disks. This difference should average less than two. |
| Disk Bytes/sec | Shows the rate, in incidents per second, at which bytes were transferred to or from the disk during write or read operations. |
| Disk Read Bytes/sec | Shows the rate, in incidents per second, at which bytes were transferred from the disk during read operations. |
| Disk Reads/sec | Shows the rate, in incidents per second, at which read operations were performed on the disk. |
| Disk Transfers/sec | Shows the rate, in incidents per second, at which read and write operations were performed on the disk. |
| Disk Write Bytes/sec | Shows the rate, in incidents per second, at which bytes were transferred to the disk during write operations. |
| Disk Writes/sec | Shows the rate, in incidents per second, at which write operations were performed on the disk. |
| Split IO/sec | Shows the rate, in incidents per second, at which input/output (I/O) requests to the disk were split into multiple requests. A split I/O might result from requesting data in a size that is too large to fit into a single I/O, or from a fragmented disk subsystem. |

In an example embodiment, a background process running at idle priority uses performance counters, optionally including one or more of the counters discussed above, and/or other mechanisms to determine the immediate load on a resource, such as a magnetic or optical mass storage device, it wishes to use. The background process can then determine when idle cycles are being allocated to the background process because another process, such as a foreground process, is waiting for an operation on that same resource to complete. In such cases, the background process optionally refrains from imposing an additional load on the resource, so that the other process can run without delay. The background process can periodically check the idle cycle allocation, and selectively determine when to access the resource so as not to unduly inhibit foreground processes' access of the resource. This allows the system to run at substantially full speed, because the background process is only using idle CPU cycles to wait for the resource to become available and not using the resource itself.

An embodiment optionally utilizes a background process which performs indexing of the contents of a user's hard disk without impacting system performance under Windows-NT based operating systems to an extent that would be readily noticeable by a user. The indexing process performs many disk I/O operations when indexing the contents of the user's hard disk to allow the user to rapidly find files which contain certain words, phrases, or strings.

By way of example, a search application can be stored on and executed by a user or host terminal. The search application can provide user interfaces for searching email, files, Web sites, cached Web pages, databases and/or the like. In addition, the search application can include a local index engine that indexes email, files, cached Web pages, databases and the like, stored in a data repository or database. For example, Web pages previously viewed in the search application's view pane or area, and optionally, stored Web pages previously viewed using other user browsers, or otherwise stored locally can be indexed. Separate indexes can be used for the email, files, cached Web pages, databases and the like, or a single index can be used for the foregoing.

The index engine can further include code configured as a scan engine or module that is used to determine whether a file is to be indexed. Thus, the index engine can also scan files to identify new targets, such as email, document files, Web pages, database entries, and the like, that have not yet been indexed, or targets that have previously been indexed but have since been modified. Optionally, rather then re-index all corresponding targets each time an index operation is performed, the index engine can incrementally index just the new or modified targets or documents. In addition, the index engine can refrain from indexing until it determines that the mass storage device, which stores the data or files to be indexed, is not being utilized by a higher priority or foreground process.

The index engine can utilize one or more indexing algorithms to create an index, such as a reverse or inverted index. The index includes a data structure that associates character strings with files, documents, and the like. In one example embodiment, for each word or character string found with a file or document, the index stores which fields of which documents or files contain that word or character string.

By way of example, the background process checks a performance counter, such as the counter named "\\PhysicalDisk\Current Disk Queue Length" for the specific disk drive instance it wishes to read from or write to. Alternatively or in addition, the background process can access the aggregate total value of the current disk queue lengths for all of the physical disk drives, whose instance is known as "_Total". Advantageously, this is easier than keeping track of which disk drive the process is about to access and checking only that one drive's queue length.

However, because Windows NT-based operating systems perform many disk and mass storage I/O operations asynchronously to and from a system cache, the background process can mistake disk I/O being performed on its own behalf as disk I/O from another process. For example, when a process writes to the disk, the data is typically written to a memory based disk cache, and then written out to the disk at a later time, allowing the process to continue operations without waiting for the disk write to complete. Thus, a check of the "current disk queue length" performance counter may not be, on its own, adequate or sufficient to allow a background process to determine whether or not another process is using the disk drive, because a queued operation might be on behalf the background process itself. If the background process were to give up the idle CPU cycles being offered under these circumstances, the background process would "err on the side of caution" and not affect the speed of foreground processes, but the background process also would not make full use of the available processor and disk bandwidth.

In one embodiment, this problem is solved by optionally allowing the background process to use idle cycles for a certain accumulated amount of time, such as 90 milliseconds or other designated time period, to perform disk intensive operations. The background process then waits a given amount of time, such as, by way of example, 10 milliseconds, and checks for pending disk or mass storage I/O by checking the "current disk queue length" counter, or other appropriate performance indicator. If the counter value is 0 or less than a specified threshold, the background process takes another time period, such as a 90 millisecond slice of idle time, and can utilize the disk. When the counter value is non-zero, or greater than a designated threshold, the background process waits a designated amount of time, such as 10 milliseconds, before checking again. This 90/10 procedure allows the background process to use the disk for 90 percent, or other designated amount of the idle time, to perform computations and to access the disk.

In another embodiment, the process gates only the disk operations performed in the background process, so that the background process can still use CPU or other resources, even as the other processes use the disk. For example, during the 10 millisecond waiting period, the background process may choose to perform other tasks, such as computation, that do not use mass storage I/O without affecting the speed of the foreground process.

When the disk is being used heavily by a foreground process, it is most likely that the disk queue length will be greater than zero when the background process checks. The fact that the "idle priority" background process is being given CPU cycles indicates that other processes on the system are waiting for something. If the other processes are waiting for the disk, then the "current disk queue length" counter will be non-zero. Despite being given the idle CPU cycles, the background process will therefore not impose an additional load on the shared resource at this time, though it may optionally choose to perform purely computational tasks or tasks that access other shared resources not currently in use.

By way of another example, under Microsoft Windows operating systems based on Windows 95, including Windows 98 Windows ME, and other Windows 9x variants, there is a similar performance counter mechanism provided by the operating system. Unfortunately, by default, for these operating systems there are no counters for the disk subsystem which measure the immediate load, such as the "current disk queue length" counter provided in NT-based systems. Thus, under a Windows 95-based operating system, such a counter needs to be provided. Windows 95 and its variants provide a mechanism called "Virtual Device Drivers" also known as VxDs, which can be inserted into the system I/O chain dynamically by a running application. One such mechanism is provided by the system entry point available to VxDs named IFSMgr_InstallFileSystemApiHook( ). Under Win 9x operating systems, drivers can monitor disk access operations by installing themselves via the IFS (installable file system) manager service, IFSMgr_InstallFileSystemAPIHook.

During device initialization, a VxD calls the IFS service, passing the address of its hook procedure as an argument. The IFS manager service, IFSMgr_InstallFileSystemAPIHook, inserts that address in an API function hook list. IFS manager API function calls involve calling installed hook procedures with parameters indicating the type of request, the drive being accessed, a pointer to an IFS I/O request structure, and other information. Thus, via the hook, the VxD can monitor file operations that result in disk activity, such as open, read, or write operations.

In an embodiment, a background process running under Windows 95 and its successors dynamically loads a VxD which uses this entry point to insert code of its own which is called whenever a file I/O operation occurs. The VxD maintains a count of the number of threads, wherein each process contains one or more simultaneously executing threads, which have called into the file system but not returned. This mechanism provides a value similar to the NT-based operating system's "current disk queue length" counter, and the background process can obtain this counter value by numerous methods, such as, by way of example, a DeviceIoControl( ) system call, which sends a control code to a specified device driver, causing the corresponding device to perform the corresponding operation.

One embodiment, which can be used in systems utilizing Windows 95-based operating systems or the like, has the VxD increment a counter each time a file or disk I/O operation is initiated. The background process checks the value of this counter before and after an interval, such as the 10 millisecond wait interval described above. If the value has changed, the background process uses this as an indication that another process has used the disk in the interim and is possibly still using the disk, and so backs off and waits for an additional period or periods of time, such as additional 10 millisecond intervals, until the counter value stops changing.

While the foregoing example utilizes a 90/10 cycle ratio, other ratios, or combinations of ratios can be used, including other integer ratios and non-integer ratios. For example, the process can use a 90/10 ratio, then 18/7, 30/10, 50/10, 70/10, 82/11, back up to 90/10, or approximations thereof, so that the background process does not just jump into a small period of nonuse by a foreground process and take another 90 milliseconds of disk use. Still other ratios can be used such as approximately 10:1, 8:1, 6:1, 4:1, 2:1, 1:1, 20:1, and so on. Thus, once disk activity has been detected, the process optionally slowly ramps up to full speed to make sure that the background process does not slow the system down too much by prematurely designating a disk as idle, when actually the foreground process was just about to continue its I/O after a very brief pause for computation.

The foregoing techniques are techniques for determining when foreground processes are being used. Other techniques can be used for determining when other applications are accessing any resource with significant context-switching time such as a hard disk, an optical drive, a tape drive, a floppy disk drive, or external coprocessor such as for graphics.

By way of example, a filter driver can be installed ahead of a system device driver associated with the mass storage device. The filter driver monitors each call into the device driver, and keeps track of one or more of the following:

a. how many calls are actively in the device driver at any given time b. when the last call was made into the device driver c. how many total calls have been made into the device driver Based on one or more of the foregoing, the filter driver, or a module in communication with the filter driver, determines whether the mass storage device is being accessed by a foreground or other process.

Similarly, virtual device drivers can be dynamically installed that intercept file or disk I/O calls and thereby determine which applications or processes are accessing the mass storage device.

Still another technique utilizes a program that monitors system calls that can result in file and/or mass storage I/O operations being performed. The monitor program installs "thunks", wherein the addresses of the system entry points are replaced with addresses that point to a stub that increments a counter and then calls the original system entry point.

Yet another technique utilizes performance-monitoring facilities, such as SNMP (Simple Network Management Protocol), WMI (Windows Management Instrumentation), and the like.

Another technique is performed by timing mass storage operations in the background process and detecting when they take more than a certain or predetermined amount of time. For example, if a disk drive has been determined to seek at an average rate of 10 milliseconds (based on historical readings), a read or write operation that takes more than 2× or other selected multiple is a sign that the disk is busy. Thus, if a read, write, or other disk operation takes more than a predetermined amount of time, a determination is made that the disk is not idle, and the background process will not attempt to access the disk at this time.

Optionally, rather than utilize the 90/10 cycle described above, one embodiment associates disk operations with their processes. Thus, rather than just relying on the performance counters, an NT file system filter driver is used that determines which process has performed the disk I/O and can "ignore" changes in the counter or items in an I/O queue when those items are known to be from the background process, either by their process ID or by the name of the file being accessed.

The use of the foregoing techniques are not limited to shared mass storage devices, but can be similarly applied to other shared resources. For example, similar techniques can be used with process switching, to run a background task less often if the foreground task keeps reloading data into the processor cache. Another application of the foregoing techniques is with respect to the use of a wireless card that has to be switched between two networks, where it takes a significant amount time to make the switch. Similarly, the above techniques can be applied to a shared network with limited bandwidth. For example, there may be multiple processes trying to access the Internet, and use of the foregoing techniques avoid having a background process slow down a transfer being made by a foreground process.

Figure 1:
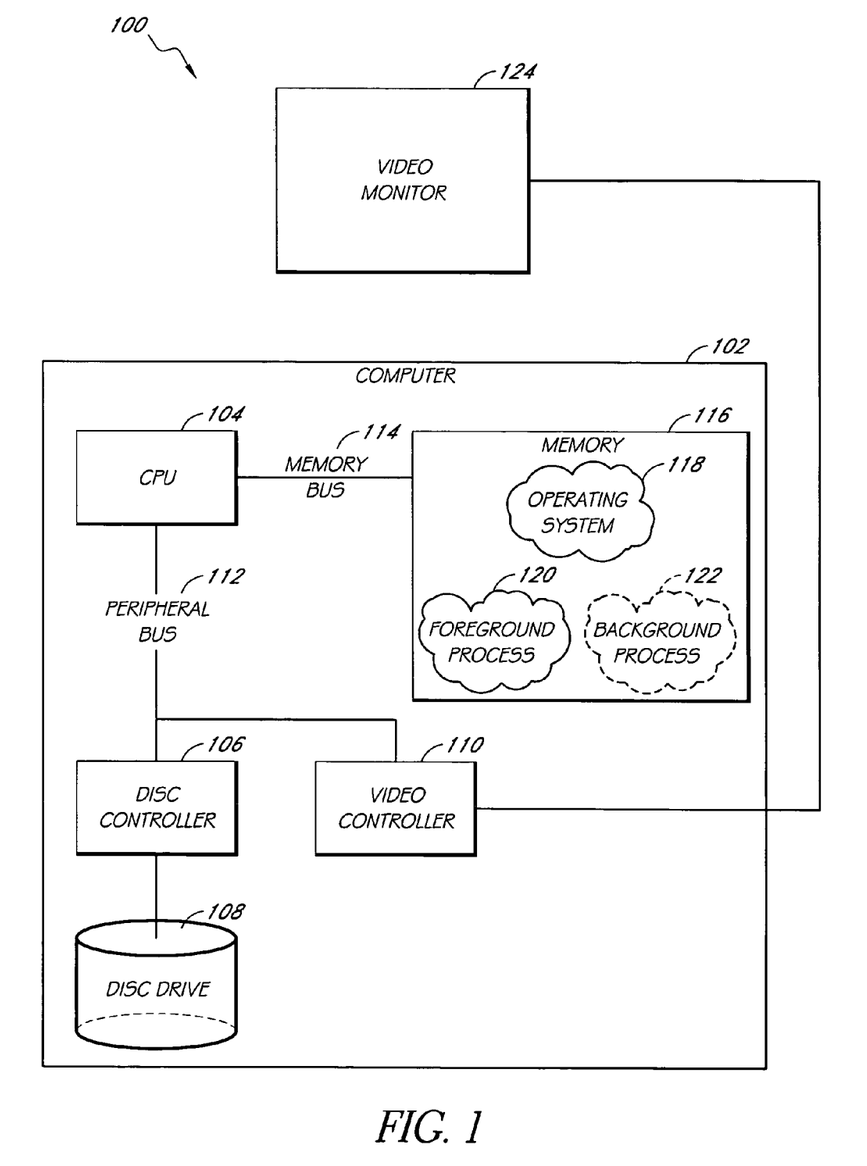
FIG. 1 illustrates an example system that can be utilized with an embodiment of the present invention.

FIG. 1 illustrates an example system that can utilize one or more of the idle detection processes discussed above. FIG. 1 depicts a computer system 100, including a computer 102, an operating system 118, running a foreground process 120 and a background process 122 (such as an index process) in memory 116, which can be random access memory (RAM), coupled to a CPU (central processing unit) 104 via a memory bus 114, a disk controller 106 coupled to the CPU 104 via peripheral bus 112, one or more mass storage devices 108, including one or more of magnetic hard disk drives, optical drives, solid state non-volatile memory, or the like. In addition, a video controller 110 is coupled to the CPU 104 and to a monitor 124. The computer system 100 includes performance monitoring software, such as discussed above, used to determine when the mass storage device 108 is being utilized by the foreground process, and when the background process 122 should access the mass storage device 108.

Figure 2:
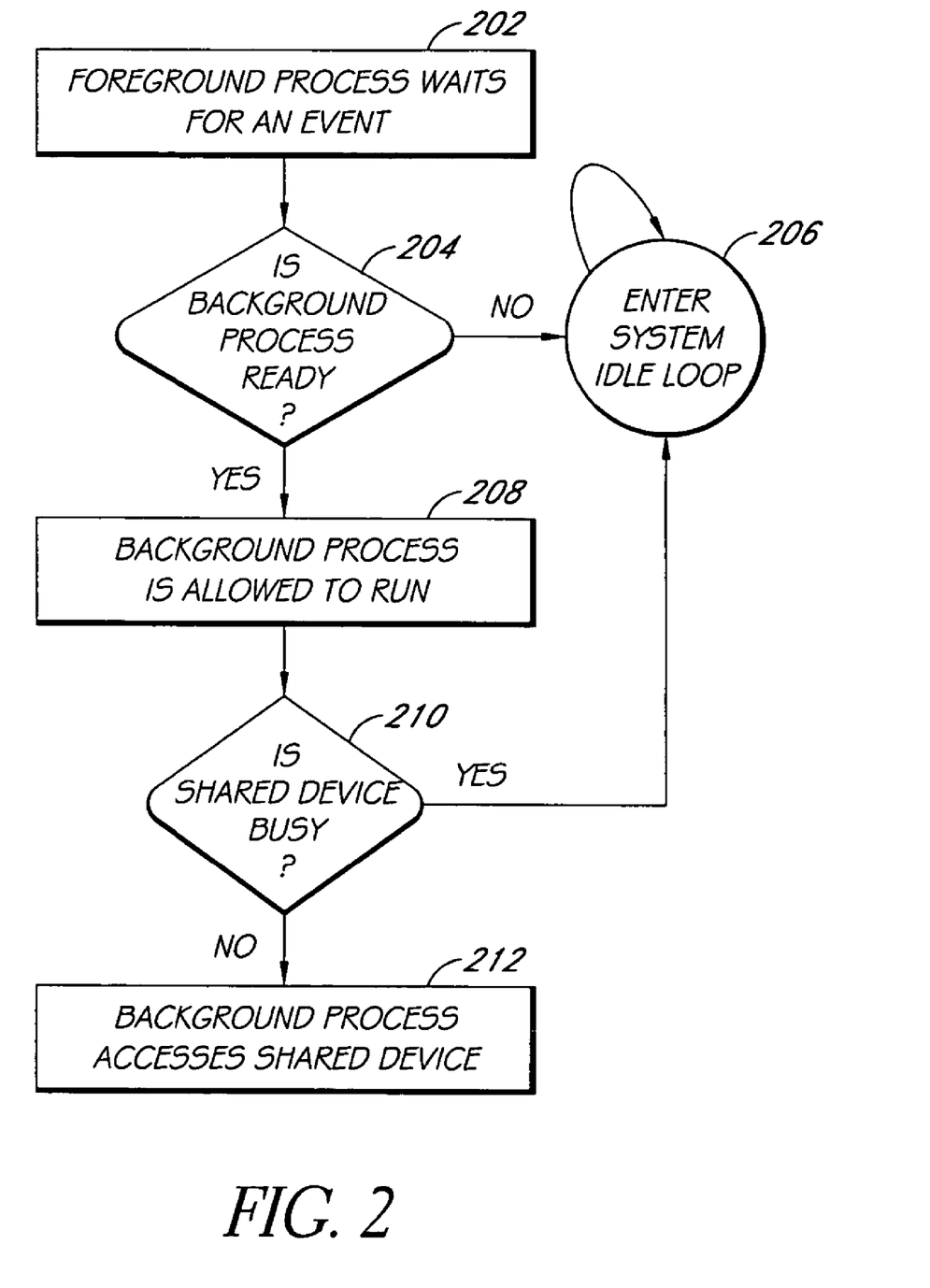
FIG. 2 illustrates an example resource sharing process.

FIG. 2 illustrates an example resource sharing process that is performed during a "time slice" of a multiprocessing system where there is a foreground process and a background process. The background process checks the busy state of a shared device before using the shared device so as to not slow down, or significantly slow down, the foreground processes use of that same shared device. By way of example, the background process can be a file index process that indexes files stored on a mass storage device, while the foreground process can be a word processor, a spreadsheet program, an email client, a database application, a browser, and so on. As depicted, the scheduling process takes into account access to a shared device, which can be a mass storage device or peripheral, by way of example. This illustrates how support for the idle detection and background process scheduling algorithm can optionally be incorporated directly into the system scheduler. As illustrated, at state 202, the foreground process is waiting for some event that may or may not be completion of I/O to the shared device. If the background process is not ready at state 204, the system enters an idle loop 206. If the background process is ready, the process proceeds from state 204 to state 208, and the background process is allowed to run. The background process then attempts to utilize the shared device. If, at state 210, the shared device is busy, the system enters an idle loop at state 206. If the shared device is not busy, the background process accesses the shared device at state 212.

Figure 3:
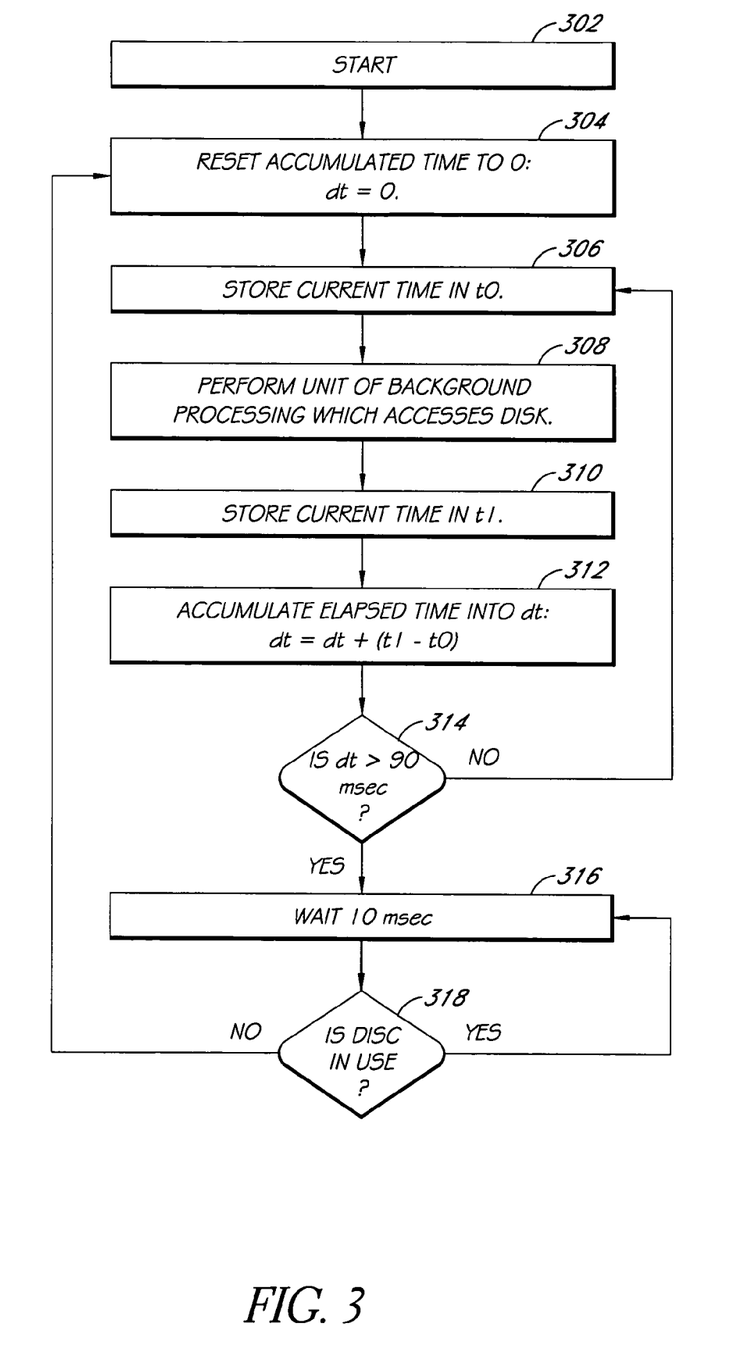
FIG. 3 illustrates another example resource sharing process applied to a background process that accesses a disk drive.

FIG. 3 shows an external (not in the operating system) implementation which allows the background process to use a large percentage, such as 90%, of the available idle CPU time as long as the disk or other mass storage device is not busy. This example process compensates for the fact that some of the time the background process may see its own disk activity by running in 90 millisecond bursts before checking the disk. This avoids the problem of the background process waiting more than it has to because it sees its own I/O activity and misinterprets the activity as being associated with another process. By way of example, the background process can be a file index process that indexes files stored on a mass storage device.

As depicted in FIG. 3, at state 302 the process starts, and at state 304 resets an accumulated variable dt to 0. At state 306, the current time is stored in variable t0. At state 308, a designated amount of background processing involving disk access is performed. At state 310, the current time is stored in variable t1. At state 312, the elapsed time is accumulated into the variable dt, where dt=dt+(t1−t0). At state 314, a determination is made as to whether dt is less than or equal to a first threshold. If dt is less than or equal to a first threshold, for example, 90 msec, the process proceeds back to state 306, where the current time is stored in variable t0. If dt is greater than the first threshold, then at state 316 the background process waits a designated period of time, such as 10 msec. At state 318, a determination is then made as to whether the disk is in use. If so, the process waits another 10 msec before trying again. Otherwise, the accumulated time is reset to 0 and the process repeats.

It should be understood that certain variations and modifications of this suggest themselves to one of ordinary skill in the art. The scope of the present to be limited by the illustrations or the foregoing descriptions thereof.

What is claimed is:

1. A method of determining when to perform a computer background process, wherein the background process is stored in memory connected to a central processing unit (CPU) via a memory bus, the method comprising:
    allowing the computer background process to access a computer resource via a peripheral bus for a first predetermined time period in response to determining that one or more idle cycles of the CPU are available;
    after the first predetermined time period has elapsed, inhibiting the computer background process from accessing the computer resource for a second predetermined time period;
    after the second predetermined time period has elapsed, determining if one or more idle cycles of the CPU are available;
    in response to determining that one or more idle cycles of the CPU are available, determining if the computer resource is being used by another process, wherein
        in response to determining that the computer resource is being used by another process, waiting for a third predetermined time period and after the third predetermined time period has elapsed, again determining if the computer resource is being used by another process, and
        in response to determining that the computer resource is not being used by another process, allowing the computer background process to access the computer resource via the peripheral bus again.

2. The method as defined in claim 1, wherein the computer resource is a mass storage device.

3. The method as defined in claim 1, wherein the computer resource is a magnetic storage device.

4. The method as defined in claim 1, wherein the computer resource is a graphics processor or a network interface.

5. The method as defined in claim 1, wherein the act of determining if the computer resource is being used by another process includes reading a performance counter, wherein the second time period expires after the performance counter ceases to provide an indication that the background process is accessing the computer resource.

6. The method as defined in claim 1, wherein the second time period is selected to ensure that the determination act does not incorrectly indicate that the computer resource is being used by another process.

7. The method as defined in claim 1, wherein the act of determining if the computer resource is being used by another process includes reading a queue length associated with the computer resource.

8. The method as defined in claim 1, wherein the computer resource includes a plurality of physical disk drives, and wherein the act of determining if the computer resource is being used by another process is based at least in part on queue lengths for the plurality of physical disk drives.

9. The method as defined in claim 1, wherein the background process is inhibited from accessing the computer resource when there is a non-zero queue length for the computer resource.

10. The method as defined in claim 1, wherein the act of determining if the computer resource is being used by another process is performed using a virtual device driver.

11. The method as defined in claim 1, wherein the act of determining if the computer resource is being used by another process is performed using one or more of a filter driver, a thunk, a simple network management protocol, a windows management instrumentation, or timing seeks.

12. The method as defined in claim 1, wherein the background process is a file indexing process.

13. The method as defined in claim 1, wherein the background process is a file indexing process and a foreground process is a word processor.

14. The method as defined in claim 1, wherein the background process is a file indexing process and a foreground process is an email process.

15. The method as defined in claim 1, wherein the background process is an indexing process that indexes one or more of email, files, or web pages.

16. The method as defined in claim 1, wherein a foreground process is a word processor, a spreadsheet program, an email client, a database application, or a browser process.

17. The method as defined in claim 1, wherein the ratio of the first predetermined time period to the second predetermined time period is in the range of 20:1 to 2:1.

18. The method as defined in claim 1, further comprising:
    allowing the computer background process to access a computer resource for a fourth predetermined time period; and
    after the fourth predetermined time period has elapsed, inhibiting the computer background process from accessing the computer resource for a fifth predetermined time period, wherein the ratio of, the first predetermined time period to the second predetermined time period is different than the ratio of the fourth predetermined time period to the fifth predetermined time period.

19. The method as defined in claim 1, wherein determining if the computer resource is being used by another process is based at least in part on one or more of:
    the number of calls actively in a device driver associated with the computer resource;
    when the last call was made into the device driver; or
    the number of total calls have been made into the device driver.

20. The method as defined in claim 1, wherein determining if the computer resource is being used by another process is based at least in part on one or more of:
    information regarding the number of packets the computer resource has received;
    or information regarding the number of packets waiting to be sent by the computer resource.

21. The method as defined in claim 1, wherein determining if the computer resource is being used by another process is based at least in part on how long a first computer resource operation took.

22. The method as defined in claim 1, further comprising determining a load on the computer resource based on one or more of:
    an average number of read and write requests queued for the computer resource during a sample interval;
    an average number of read requests queued for the computer resource during a corresponding sample interval;

an average number of write requests queued for the computer resource during a corresponding sample interval; or a number of outstanding computer resource requests.

23. The method as defined in claim 1, wherein the background process accesses a second computer resource during the second predetermined time period.

24. The method as defined in claim 1, wherein the second predetermined time period is the same as the third predetermined time period.

25. A computer system that detects a computer resource idle condition, the computer system comprising:
   a processor;
   memory coupled to the processor via a memory bus;
   a computer resource coupled to the processor via a peripheral bus; and
   program instructions stored in the memory configured to:
      enable a computer background process to access the computer resource via the peripheral bus for a first time period in response to determining that cycles of the processor are available for the computer background process;
      after the first predetermined time period has elapsed, prevent the computer background process from accessing the computer resource for a second time period;
      determine if the computer resource is idle and if processor cycles are available for the computer background process;
      allow the computer background process to access the computer resource via the peripheral bus again in response to determining that the computer resource is idle and that processor cycles are available for the computer background process;
      prevent the computer background process from accessing the computer resource for a third time period in response to determining that the computer resource is not idle or that processor cycles are not available for the computer background process, and after the third time period has elapsed, again determine if the computer resource is idle and if processor cycles are available for the computer background process.

26. The computer system as defined in claim 25, wherein the computer resource is a mass storage device.

27. The computer system as defined in claim 25, wherein the computer resource is a magnetic storage device.

28. The computer system as defined in claim 25, wherein the computer resource is a graphics processor or a network interface.

29. The computer system as defined in claim 25, further comprising a performance indicator used to determine if the computer resource is idle, wherein the second time period is selected to expire after the performance indicator ceases to provide an indication that the background process is accessing the computer resource.

30. The computer system as defined in claim 25, wherein the second time period is selected to ensure that the idle determination does not incorrectly indicate that the computer resource is being used by another process.

31. The computer system as defined in claim 25, further comprising a queue length associated with the computer resource, wherein the queue length provides an indication as to whether the computer resource is idle.

32. The computer system as defined in claim 25, wherein the computer resource includes a plurality of physical disk drives and associated queue lengths for the plurality of physical disk drives, wherein the queue lengths provide an indication as to whether the plurality of physical disk drives are idle.

33. The computer system as defined in claim 25, further comprising a computer resource queue having an associated length, wherein the background process is inhibited from accessing the computer resource when there is a non-zero queue length for the computer resource.

34. The computer system as defined in claim 25, further comprising a virtual device driver that provides a computer resource idle indication.

35. The computer system as defined in claim 25, further comprising one or more of a filter driver, a thunk, a simple network management protocol, a windows management instrumentation, or disk seek timing instructions, that provide a computer resource idle indication.

36. The computer system as defined in claim 25, wherein the background process is a file indexing process.

37. The computer system as defined in claim 25, wherein the background process is a file indexing process and a foreground process is a word processor.

38. The computer system as defined in claim 25, wherein the background process is a file indexing process and a foreground process is an email process.

39. The computer system as defined in claim 25, wherein the background process is an indexing process that indexes one or more of email, files, or web pages.

40. The computer system as defined in claim 25, wherein a foreground process is a word processor, a spreadsheet program, an email client, a database application, or a browser process.

41. The computer system as defined in claim 25, wherein the ratio of the first predetermined time period to the second predetermined time period is in the range of 20:1 to 2:1.

42. The computer system as defined in claim 25, further comprising instructions stored in computer readable memory configured to:
   allow the computer background process to access a computer resource for a fourth predetermined time period;
   after the third predetermined time period has elapsed, inhibit the computer background process from accessing the computer resource for a fifth predetermined time period, wherein the ratio of the first predetermined time period to the second predetermined time period is different than the ratio of the fourth predetermined time period to the fifth predetermined time period.

43. The computer system as defined in claim 25, wherein the idle condition is determined based at least in part on one or more of:
   the number of calls actively in a device driver associated with the computer resource;
   when the last call was made into the device driver; or
   the number of total calls have been made into the device driver.

44. The computer system as defined in claim 25, wherein the idle condition is determined based at least in part on how long a first computer resource operation took.

45. The computer system as defined in claim 25, further comprising instructions stored in computer readable memory configured to determine a load on the computer resource based on one or more of:
   an average number of read and write requests queued for the computer resource during a sample interval;
   an average number of read requests queued for the computer resource during a corresponding sample interval;

an average number of write requests queued for the computer resource during a corresponding sample interval; or a number of outstanding computer resource requests.

46. The computer system as defined in claim 25, wherein the background process accesses a second computer resource during the second predetermined time period.

47. The computer system as defined in claim 25, further comprising the background process and a foreground process.

48. A method of allocating access to a computer resource, the method comprising:

permitting a first process to access a computer resource via a peripheral bus of a computing system for a first time period in response to determining that cycles of a processor are available for the first process, wherein the first process is stored in a memory available to the processor via a memory bus;

after the first time period has elapsed, inhibiting the first process from accessing the computer resource for a second time period;

after the second time period has elapsed, determining if cycles of the processor are available for the first process;

in response to determining that cycles of the processor are available for the first process, determining if the computer resource is idle based at least in part on a computer resource performance indicator, wherein in response to determining that the computer resource is not idle, waiting for a third predetermined time period and after the third predetermined time period has elapsed, again determining if the computer resource is idle, and in response to determining that the computer resource is idle, allowing the first process to access the computer resource via the peripheral bus again.

49. The method as defined in claim 48, wherein the computer resource is a mass storage device.

50. The method as defined in claim 48, wherein the computer resource is a magnetic storage device.

51. The method as defined in claim 48, wherein the computer resource is a graphics processor or a network interface.

52. The method as defined in claim 48, wherein the performance indicator is a performance counter, and wherein the second time period expires after the performance counter ceases to provide an indication that the first process is accessing the computer resource.

53. The method as defined in claim 48, wherein the second time period is selected to ensure that the determination act does not incorrectly indicate that the computer resource is being used by another process.

54. The method as defined in claim 48, wherein the performance indicator is a queue length associated with the computer resource.

55. The method as defined in claim 48, wherein the performance indicator is a queue length associated with the computer resource, and wherein the first process is inhibited from accessing the computer resource when there is a non-zero queue length for the computer resource.

56. The method as defined in claim 48, wherein the first process is a file indexing process.

57. The method as defined in claim 48, wherein the first process is a file indexing process and a second process is one of a word processor or an email process.

58. The method as defined in claim 48, wherein the first process is an indexing process that indexes one or more of email, files, or Web pages.

59. The method as defined in claim 48, wherein a second process is a word processor, a spreadsheet program, an email client, a database application, or a browser process.

60. The method as defined in claim 48, wherein the ratio of the first predetermined time period to the second predetermined time period is in the range of 20:1 to 2:1.

61. The method as defined in claim 48, further comprising:

allowing the first process to access a computer resource for a fourth predetermined time period;

after the fourth predetermined time period has elapsed, inhibiting the first process from accessing the computer resource for a fifth predetermined time period, wherein the ratio of the first predetermined time period to the second predetermined time period is different than the ratio of the fourth predetermined time period to the fifth predetermined time period.

62. The method as defined in claim 48, wherein the performance indicator provides information relating to one or more of:

the number of calls actively in a device driver associated with the computer resource;

when the last call was made into the device driver; or the number of total calls have been made into the device driver.

63. The method as defined in claim 48, wherein the performance indicator provides information relating to one or more of:

the number of packets the computer resource has received; or the number of packets waiting to be sent by the computer resource.

64. The method as defined in claim 48, wherein the performance indicator provides information relating to how long a first computer resource operation took.

65. The method as defined in claim 48, the performance indicator provides information relating to on one or more of:

an average number of read and write requests queued for the computer resource during a sample interval;

an average number of read requests queued for the computer resource during a corresponding sample interval;

an average number of write requests queued for the computer resource during a corresponding sample interval; or a number of outstanding computer resource requests.

66. The method as defined in claim 48, wherein the first process accesses a second computer resource during the second predetermined time period.

67. A system that allocates access to a computer resource, the system comprising:

computer readable memory; and instructions stored in the computer readable memory connected to a central processing unit (CPU), the instructions configured for execution by the processor in order to:

permit a first process to access a computer resource via a peripheral bus for a first time period in response to determining that one or more cycles of the CPU are available;

after the first time period has elapsed, inhibit the first process from accessing the computer resource for a second time period;

after the second time period has elapsed, determine if one or more cycles of a CPU are available;

in response to determining that one or more cycles of the CPU are available, determine if the computer resource is idle based at least in part on a computer resource performance indicator, wherein in response to determining that the computer resource is not idle, cause the first process to wait for a third predetermined time period and, after the third predetermined time period has elapsed, again determine if the computer resource is idle, and in response to determining that the computer resource is idle, allow the first process to access the computer resource via the peripheral bus again.

68. The system as defined in claim 67, wherein the computer resource is a mass storage device.

69. The system as defined in claim 67, wherein the computer resource is a magnetic storage device.

70. The system as defined in claim 67, wherein the computer resource is a graphics processor or a network interface.

71. The system as defined in claim 67, wherein the performance indicator is a performance counter, and wherein the second time period expires after the performance counter ceases to provide an indication that the first process is accessing the computer resource.

72. The system as defined in claim 67, wherein the second time period is selected to ensure that the determination act does not incorrectly indicate that the computer resource is being used by another process.

73. The system as defined in claim 67, wherein the performance indicator is a queue length associated with the computer resource.

74. The system as defined in claim 67, wherein the performance indicator is a queue length associated with the computer resource, and wherein the first process is inhibited from accessing the computer resource when there is a non-zero queue length for the computer resource.

75. The system as defined in claim 67, wherein the first process is a file indexing process.

76. The system as defined in claim 67, wherein the first process is a file indexing process and a second process is one of a word processor or an email process.

77. The system as defined in claim 67, wherein the first process is an indexing process that indexes one or more of email, files, or Web pages.

78. The system as defined in claim 67, wherein a second process is a word processor, a spreadsheet program, an email client, a database application, or a browser process.

79. The system as defined in claim 67, wherein the ratio of the first predetermined time period to the second predetermined time period is in the range of 20:1 to 2:1.

80. The system as defined in claim 67, wherein the performance indicator provides information relating to one or more of:

the number of calls actively in a device driver associated with the computer resource;

when the last call was made into the device driver; or the number of total calls have been made into the device driver.

81. The system as defined in claim 67, wherein the performance indicator provides information relating to one or more of:

the number of packets the computer resource has received; or the number of packets waiting to be sent by the computer resource.

82. The system as defined in claim 67, wherein the performance indicator provides information relating to how long a first computer resource operation took.

83. The system as defined in claim 67, the performance indicator provides information relating to on one or more of:

an average number of read and write requests queued for the computer resource during a sample interval;

an average number of read requests queued for the computer resource during a corresponding sample interval;

an average number of write requests queued for the computer resource during a corresponding sample interval; or a number of outstanding computer resource requests.

84. The system as defined in claim 67, wherein the first process is allowed to accesses a second computer resource during the second predetermined time period.

85. The system as defined in claim 67, further comprising instructions stored in the computer readable memory configured to:

allow the first process to access a computer resource for a fourth predetermined time period;

after the third predetermined time period has elapsed, inhibit the first process from accessing the computer resource for a fifth predetermined time period, wherein the ratio of the first predetermined time period to the second predetermined time period is different than the ratio of the fourth predetermined time period to the fifth predetermined time period.

86. A method of allocating access to one or more computer resources, the method comprising:

permitting a first process to access one or more computer resources via a peripheral bus for a first time period in response to determining that cycles of a central processing unit (CPU) are available for the first process, wherein the process is stored in memory in data communication with the CPU via a memory bus;

after the first time period has elapsed, inhibiting the first process from accessing the one or more computer resources for a second time period;

after the second time period has elapsed, determining if cycles of the central processing unit are available for the first process;

in response to determining that cycles of the CPU are available for the first process, determining if one or more of the computer resources are available, wherein in response to determining that the one or more computer resources are not idle, waiting for a third predetermined time period and, after the third predetermined time period has elapsed, again determining if the one or more computer resources are idle, and in response to determining that the one or more computer resources are idle, allowing the first process to access the one or more computer resource via the peripheral bus again.

* * * * *